United States Patent
Hirschmann et al.

(10) Patent No.: US 11,280,281 B2
(45) Date of Patent: Mar. 22, 2022

(54) OPERATING METHOD FOR A DRIVER ASSISTANCE SYSTEM AND MOTOR VEHICLE

(71) Applicant: MAN Truck & Bus AG, Munich (DE)

(72) Inventors: Steffen Hirschmann, Neustadt an der Aisch (DE); Dominic Hyna, Fürth (DE)

(73) Assignee: MAN TRUCK & BUS AG, Munich (DE)

(*) Notice: Subject to any disclaimer, the term of this patent is extended or adjusted under 35 U.S.C. 154(b) by 0 days.

(21) Appl. No.: 15/978,861

(22) Filed: May 14, 2018

(65) Prior Publication Data

US 2018/0334973 A1 Nov. 22, 2018

(30) Foreign Application Priority Data

May 18, 2017 (DE) .......................... 102017004819.3

(51) Int. Cl.
*F02D 41/00* (2006.01)
*F02D 13/04* (2006.01)
(Continued)

(52) U.S. Cl.
CPC ......... *F02D 41/0007* (2013.01); *B60W 10/06* (2013.01); *B60W 10/10* (2013.01);
(Continued)

(58) Field of Classification Search
CPC ........... F02D 13/02–0273; F02D 13/04; F02D 41/021; F02D 2041/001; F02D 2041/1412;
(Continued)

(56) References Cited

U.S. PATENT DOCUMENTS 5,146,890 A * 9/1992 Gobert .................... F01L 13/06
123/321
5,921,883 A * 7/1999 Bellinger ................ F16H 61/21
477/33
(Continued)

FOREIGN PATENT DOCUMENTS

CN 103573453 A 2/2014
DE 10105721 A1 9/2001
(Continued)

OTHER PUBLICATIONS

Russian Office Action issued in Russian Application No. 2018118212/11 (028414) dated Aug. 6, 2021 with English translation.
(Continued)

*Primary Examiner* — John M Zaleskas
(74) *Attorney, Agent, or Firm* — Weber Rosselli & Cannon LLP

(57) ABSTRACT

An operating method for a driver assistance system, in particular a cruise control system of a motor vehicle. The operating method comprises determining at least one operationally relevant road property of a road on an impending route of the motor vehicle, wherein the operationally relevant road property affects operation of an internal combustion engine of the motor vehicle. The operating method comprises determining a driving recommendation in accordance with the operationally relevant road property on the impending route of the motor vehicle. The operating method comprises setting the variable valve gear in accordance with the driving recommendation determined.

20 Claims, 7 Drawing Sheets

(51) Int. Cl.
| | | |
|---|---|---|
| *B60W 10/06* | (2006.01) | |
| *B60W 10/10* | (2012.01) | |
| *B60W 30/18* | (2012.01) | |
| *F01L 13/06* | (2006.01) | |
| *F02D 13/02* | (2006.01) | |
| *F16H 63/42* | (2006.01) | |
| *F16H 63/50* | (2006.01) | |
| *B60W 50/14* | (2020.01) | |
| *B60W 10/11* | (2012.01) | |
| *B60W 30/19* | (2012.01) | |
| *F02D 41/14* | (2006.01) | |
| *F02D 41/02* | (2006.01) | |

(52) U.S. Cl.
CPC ...... *B60W 10/11* (2013.01); *B60W 30/18136* (2013.01); *B60W 30/19* (2013.01); *B60W 50/14* (2013.01); *F01L 13/065* (2013.01); *F02D 13/02* (2013.01); *F02D 13/04* (2013.01); *F02D 41/0002* (2013.01); *F16H 63/42* (2013.01); *F16H 63/502* (2013.01); B60W 2552/15 (2020.02); B60W 2552/20 (2020.02); B60W 2552/30 (2020.02); B60W 2555/60 (2020.02); B60W 2556/50 (2020.02); B60W 2556/60 (2020.02); B60W 2710/0633 (2013.01); B60W 2710/0638 (2013.01); B60W 2710/0694 (2013.01); B60W 2710/10 (2013.01); B60Y 2400/435 (2013.01); F02D 41/023 (2013.01); F02D 2041/001 (2013.01); F02D 2041/1412 (2013.01); F02D 2200/701 (2013.01); F02D 2200/702 (2013.01)

(58) Field of Classification Search
CPC .......... F02D 2200/701; F02D 2200/702; F01L 13/06; F01L 13/065; B60W 2250/142; B60W 2250/143; B60W 2250/22; B60W 2250/402; B60W 2250/406; B60W 30/18136; B60W 50/0097
See application file for complete search history.

(56) References Cited

U.S. PATENT DOCUMENTS

| | | | | |
|---|---|---|---|---|
| 6,098,005 | A * | 8/2000 | Tsukamoto | F16H 59/66 477/97 |
| 6,151,549 | A * | 11/2000 | Andrews | F02D 41/0007 180/167 |
| 6,246,948 | B1 * | 6/2001 | Thakker | G08G 1/096725 123/351 |
| 7,072,747 | B2 * | 7/2006 | Armbruster | B61L 3/006 246/122 R |
| 7,274,986 | B1 * | 9/2007 | Petridis | F02D 41/3076 701/102 |
| 7,957,892 | B2 * | 6/2011 | Hyde | F01N 9/00 60/274 |
| 8,335,635 | B2 * | 12/2012 | Hyde | F02D 41/021 701/114 |
| 8,335,636 | B2 * | 12/2012 | Hyde | F02D 41/021 701/114 |
| 8,386,148 | B2 * | 2/2013 | Hyde | F02D 41/021 701/102 |
| 8,700,256 | B2 * | 4/2014 | Duraiswamy | B60W 30/143 340/439 |
| 9,938,908 | B2 * | 4/2018 | Li | F02D 11/02 |
| 10,273,874 | B2 * | 4/2019 | Santillo | F02B 37/12 |
| 2003/0015172 | A1 * | 1/2003 | Leman | F01L 13/06 123/322 |
| 2004/0068359 | A1 * | 4/2004 | Neiss | B60K 31/0058 701/96 |
| 2005/0149248 | A1 * | 7/2005 | Polen | F02D 41/021 701/105 |
| 2005/0251299 | A1 * | 11/2005 | Donnelly | B60L 7/08 701/19 |
| 2006/0064232 | A1 * | 3/2006 | Ampunan | B60T 7/16 701/115 |
| 2006/0199699 | A1 * | 9/2006 | Berglund | F02D 13/0207 123/90.15 |
| 2007/0112475 | A1 * | 5/2007 | Koebler | B60L 3/12 701/1 |
| 2007/0192018 | A1 * | 8/2007 | Gibson | F02D 13/04 701/110 |
| 2008/0041336 | A1 * | 2/2008 | Gibson | F02D 41/0005 123/322 |
| 2012/0221217 | A1 * | 8/2012 | Sujan | B60W 10/06 701/54 |
| 2012/0260870 | A1 * | 10/2012 | Wahl | F01L 1/053 123/90.6 |
| 2013/0024086 | A1 * | 1/2013 | Henry | F02D 41/021 701/102 |
| 2013/0197775 | A1 * | 8/2013 | Szwabowski | F02D 11/105 701/101 |
| 2013/0268150 | A1 * | 10/2013 | Weslati | G06F 17/00 701/22 |
| 2013/0274952 | A1 * | 10/2013 | Weslati | B60W 50/0097 701/1 |
| 2014/0366836 | A1 * | 12/2014 | McConville | F01L 13/0036 123/294 |
| 2016/0264129 | A1 * | 9/2016 | Kato | B60W 10/06 |
| 2018/0283242 | A1 * | 10/2018 | Hirschmann | F01L 1/047 |
| 2018/0334975 | A1 * | 11/2018 | Hirschmann | F02D 41/023 |
| 2019/0277166 | A1 * | 9/2019 | Malischewski | F01L 1/047 |

FOREIGN PATENT DOCUMENTS

| | | | | |
|---|---|---|---|---|
| DE | 60215265 T2 | 4/2007 | | |
| DE | 60215265 T2 | 4/2007 | | |
| DE | 102010048323 A1 | 4/2012 | | |
| DE | 102011075537 A1 | 11/2012 | | |
| DE | 102012209026 A1 | 12/2013 | | |
| EP | 0458857 A1 | 12/1991 | | |
| EP | 0458857 B1 | 9/1993 | | |
| EP | E P-2441634 A2 * | 4/2012 | ........ | B60W 50/0097 |
| EP | 2955357 A1 | 12/2015 | | |
| GB | 2044851 A * | 10/1980 | .............. | F02D 9/06 |
| RU | 147231 U1 | 10/2014 | | |
| WO | 2004111415 A1 | 12/2004 | | |

OTHER PUBLICATIONS

Chinese Office Action issued in Chinese Patent Application No. 201810479507.8 dated Nov. 2, 2021, with English translation, 21 pages.

* cited by examiner

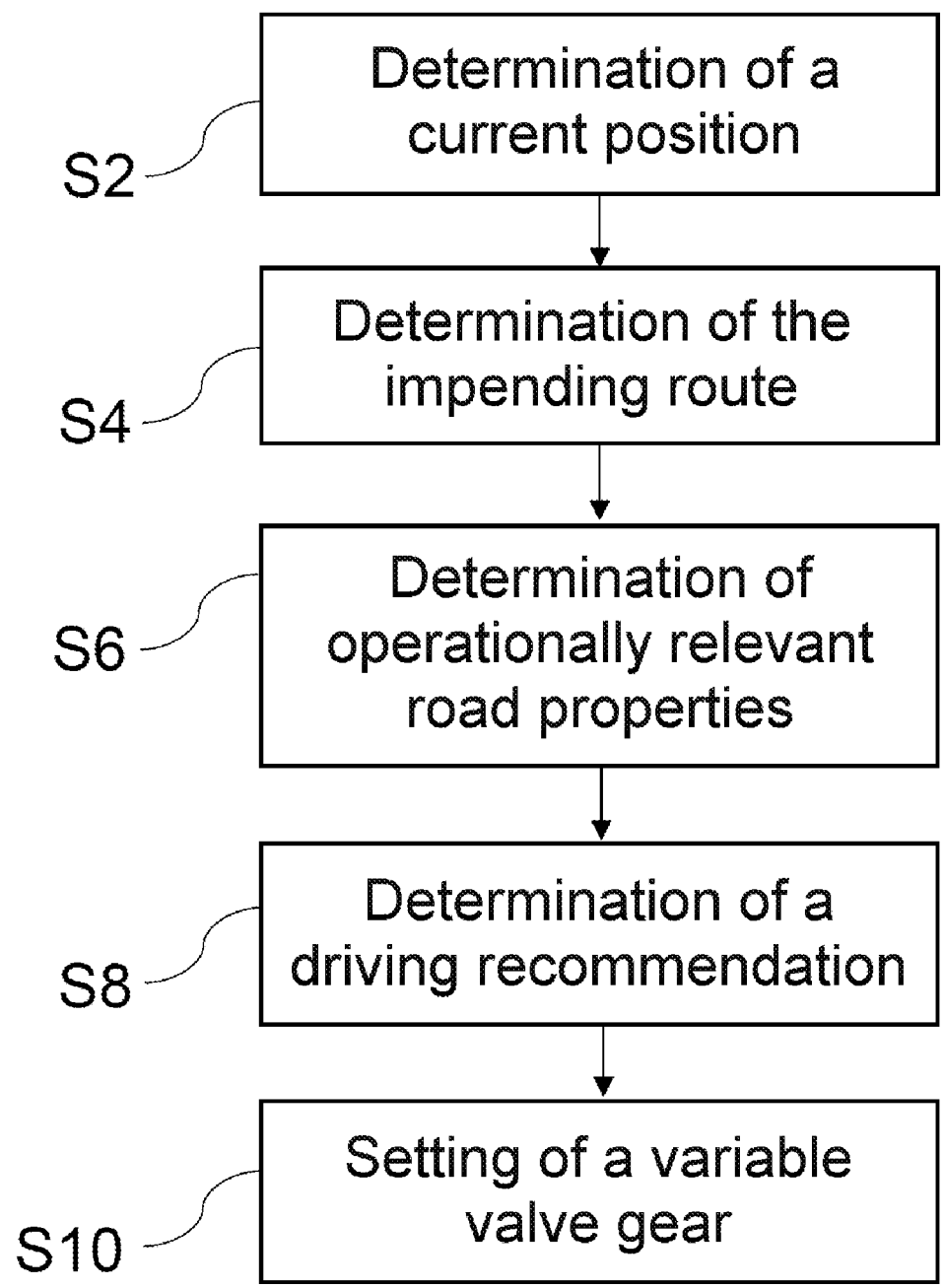

OPERATING METHOD FOR A DRIVER ASSISTANCE SYSTEM AND MOTOR VEHICLE

BACKGROUND

Driver assistance systems can be used in motor vehicles to take over certain tasks. Driver assistance systems can be limited to giving information to a vehicle driver. However, it is also possible for driver assistance systems to automatically control certain aspects of the driving of the motor vehicle. For example, a cruise control system makes it possible to automatically maintain a set speed. "GPS-controlled" cruise control systems, which acquire a road profile containing uphill and downhill slopes in advance, are also known. The cruise control system can then adapt a transmission ratio and speed for economical driving and suppress downshifts whenever appropriate, for example.

An operating method for driver assistance is disclosed in DE 10 2010 048 323 A1, for example. The operating method for a driver assistance system assists a vehicle driver of a motor vehicle in reducing fuel consumption by the motor vehicle. The operating method has the following steps: determining a driving recommendation to reduce the fuel consumption of the motor vehicle; determining at least one consumption-relevant road property of a road on the impending route of the motor vehicle, wherein the consumption-relevant road property affects the fuel consumption of the motor vehicle; and determining the driving recommendation which is suitable for increasing acceptance by the vehicle driver and making the manner of operation of the driver assistance system plausible by virtue of its depiction of future developments with respect to time.

SUMMARY

The present disclosure relates to an operating method for a driver assistance system and a motor vehicle. It is the underlying object of the present disclosure to provide an improved operating method for a driver assistance system. In particular, further potential for fuel saving and the operation of exhaust gas aftertreatment systems should be exploited.

The operating method is provided for in a driver assistance system, in particular a cruise control system, preferably a cruise control system controlled by a satellite location device, of a motor vehicle, preferably a commercial vehicle. The motor vehicle has an internal combustion engine that has a variable valve gear, in particular one that has a plurality of sliding cam systems, for adjusting the valve timing curves of the inlet and/or exhaust valves of the internal combustion engine. The method comprises determining at least one operationally relevant road property of a road on an impending route of the motor vehicle. The operationally relevant road property affects operation of the internal combustion engine of the motor vehicle. The method comprises determining a driving recommendation in accordance with the operationally relevant road property on the impending route of the motor vehicle and setting the variable valve gear in accordance with the driving recommendation determined.

By setting the variable valve gear in accordance with the driving recommendation determined, it is possible to exploit hitherto unexploited potential for fuel saving and for the operation of exhaust gas aftertreatment systems.

In particular, an operationally relevant road property can be operation of an exhaust gas aftertreatment device, e.g. an SCR or oxidation catalytic converter, a load of the internal combustion engine and/or the fuel consumption of the internal combustion engine.

In one embodiment, the variable valve gear allows adjustment of the inlet and/or exhaust valves within a predetermined adjustment range. The driving recommendation can then additionally be determined in accordance with the predetermined adjustment range.

In another embodiment, the operating method comprises informing a vehicle driver of the motor vehicle acoustically, visually and/or haptically of the driving recommendation. It is thereby possible to improve acceptance of the driver assistance system.

As an alternative or in addition, the operating method comprises automatically implementing the driving recommendation by means of the motor vehicle and/or the driver assistance system. Consequently, the burden on the vehicle driver of the motor vehicle can be relieved.

In a variant embodiment, the operationally relevant road property comprises a topology, in particular a downhill slope, an uphill slope and/or a bend of the road, of the impending route. Thus, the driving recommendation can be adapted to the topology.

In another variant embodiment, the operationally relevant road property comprises a traffic regulation, in particular a speed restriction and/or a priority regulation, applying to the road. Consequently, the driving recommendation can be adapted to the applicable traffic regulation.

In addition or as an alternative, the operationally relevant road property can comprise a current traffic situation. This has the advantage that the driving recommendation can be adapted to the current driving situation.

In one illustrative embodiment, the method comprises determining a current position of the motor vehicle by means of a location device, in particular by means of a satellite location device.

In another illustrative embodiment, the method comprises determining the impending route of the motor vehicle in accordance with a current position of the motor vehicle. In particular, the impending route of the motor vehicle can be read out of a route memory of a navigation system and/or received via a data link, for example.

In a development, the method comprises reading the operationally relevant road properties out of a navigation database and/or receiving the operationally relevant road properties via a data link, for example.

In another variant embodiment, the method comprises determining the driving recommendation in accordance with the operationally relevant road property on the impending route of the motor vehicle and with a current position of the motor vehicle.

In a further embodiment, the variable valve gear sets the timings of the inlet and/or exhaust valves in a cylinder-selective manner in accordance with the driving recommendation determined. Depending on the requirements, it is thus possible to adjust no valve, several valves or all the valves in accordance with the driving recommendation. It is thereby possible to exploit further potential, in particular in respect of fuel-efficient consumption.

For example, it is possible for the variable valve gear to adjust the timings only for some of the inlet and/or exhaust valves in accordance with the driving recommendation determined.

In one illustrative embodiment, the driving recommendation comprises a gear change, in particular an automatic gear change, to a higher gear. The variable valve gear is then switched to an upshift assistance mode to shorten a duration of the gear change.

In particular, the higher gear can comprise a higher ratio than a current gear.

In another illustrative embodiment, the driving recommendation comprises a sustained braking mode of the internal combustion engine. The variable valve gear can then be switched to an engine braking mode.

In a yet another development, in the upshift assistance mode and/or in the engine braking mode, at least one exhaust valve of the internal combustion engine is initially held closed in the compression stroke and/or in the exhaust stroke in order to compress air and is opened before a top dead centre position of a piston movement is reached in order to decompress the compressed air. It is thereby possible to achieve a considerable reduction in engine speed within a short time without actuating an exhaust throttle valve and an associated impairment of the operation of a turbocharger.

In one embodiment, a number of exhaust valves is determined in the upshift assistance mode in accordance with the operationally relevant road property on the impending route of the motor vehicle, with a required speed reduction for the gear change, with a required torque increase for the gear change, with a desired duration of the gear change, with a desired turbocharger speed and/or with a desired boost pressure.

As an alternative or in addition, a number of exhaust valves is determined in the engine braking mode in accordance with the operationally relevant road property on the impending route of the motor vehicle, in particular a downhill slope and/or a speed restriction. Thus, it is possible, for example, for one, several or all of the exhaust valves to be operated in the engine braking mode, depending on the downhill slope or the required speed reduction.

In the engine braking mode and/or an upshift assistance mode, it is possible, in particular, to omit fuel injection and/or to leave actuation of the at least one inlet valve unchanged.

In the engine braking mode and/or upshift assistance mode, the exhaust valve can, in particular, be opened between 100° crank angle and 60° crank angle before top dead centre. As an alternative or in addition, it is possible for the exhaust valve, after opening in the exhaust stroke, to close in the region between top dead centre and 30° crank angle after top dead centre. As an alternative or in addition, it is possible for the exhaust valve, after opening in the compression stroke, to close in the region between bottom dead centre and 30° crank angle after bottom dead centre. It is thereby possible to achieve an effective engine braking mode and upshift assistance mode.

In another embodiment, the driving recommendation comprises adapting an exhaust gas temperature, adapting an operating point of a turbocharger of the internal combustion engine, adapting an air flow rate and/or operating the internal combustion engine in a low-load range. The variable valve gear can then be switched to a Miller mode.

In particular, the low-load range can extend below a mean pressure of the internal combustion engine of 6 bar, 5 bar or 4 bar.

In the Miller mode, it is possible, in particular, for a closing point of an inlet valve to be advanced relative to a normal mode. In the normal mode, the inlet valve closes in the region of reaching a bottom dead centre position of a piston movement at the end of the inlet stroke. In the Miller mode, the closing point of the inlet valve is before the bottom dead centre position of the piston movement is reached. In the Miller mode, the closing point can be, in particular, equal to or more than 5° crank angle, 10° crank angle, 20° crank angle or 30° crank angle before the closing point in the normal mode.

In a development, a number of exhaust valves is determined in the Miller mode in accordance with the operationally relevant road property on the impending route of the motor vehicle, with a desired exhaust gas temperature, with a desired air flow rate, with a load of the internal combustion engine and/or with an operating point of a turbocharger of the internal combustion engine. Consequently, it is possible for just one, several or all of the inlet valves to be operated in the Miller mode, depending on the situation.

In one illustrative embodiment, each sliding cam system has a cam carrier, which is arranged on a camshaft of the internal combustion engine in a manner which prevents relative rotation and allows axial movement and has a first cam for a normal mode and a second cam, arranged offset in a longitudinal direction of the camshaft, for an engine braking mode, an upshift assistance mode and/or a Miller mode. The sliding cam system optionally puts the first cam and at least one exhaust valve and/or inlet valve into operative connection or puts the second cam and at least one exhaust valve and/or inlet valve into operative connection. The sliding cam systems offer a quick and reliable means of switching between different valve timing curves.

The disclosure also relates to a motor vehicle, in particular a commercial vehicle. The commercial vehicle can be a bus or a heavy goods vehicle, for example. The motor vehicle has a location device, in particular a satellite location device. The motor vehicle has a driver assistance system which is designed to carry out the operating method according to one of the preceding claims.

In a development, the motor vehicle has a navigation system and/or a variable valve gear for an internal combustion engine, having a plurality of cylinders, of the motor vehicle. The variable valve gear has at least one inlet valve and/or exhaust valve. The variable valve gear has at least one camshaft and a plurality of sliding cam systems for the plurality of cylinders. Each sliding cam system has a cam carrier, which is arranged on the camshaft in a manner which prevents relative rotation and allows axial movement and has a first cam and a second cam. The first cam and the second cam are arranged offset in a longitudinal direction of the camshaft.

In another embodiment, the variable valve gear has a phase adjuster. The phase adjuster is designed to adjust a rotation angle of the camshaft relative to a rotation angle of a crankshaft of the internal combustion engine. Thus, the phase adjuster can allow adjustment of the timings of the respective inlet and/or exhaust valves. The phase adjuster can be designed as a hydraulic phase adjuster, in particular as a rotary-actuator phase adjuster.

BRIEF DESCRIPTION OF THE DRAWINGS

The above-described embodiments and features of the disclosure can be combined in any desired manner. Further details and advantages of the disclosure are described below with reference to the attached drawings, in which:

FIG. 8 shows an illustrative operating method for a driver assistance system.

The embodiments shown in the figures correspond at least partially, and therefore similar or identical parts are provided with the same reference signs and the explanation thereof also involves reference to the description of the other embodiments and figures in order to avoid repetitions.

DETAILED DESCRIPTION

Figure 1:
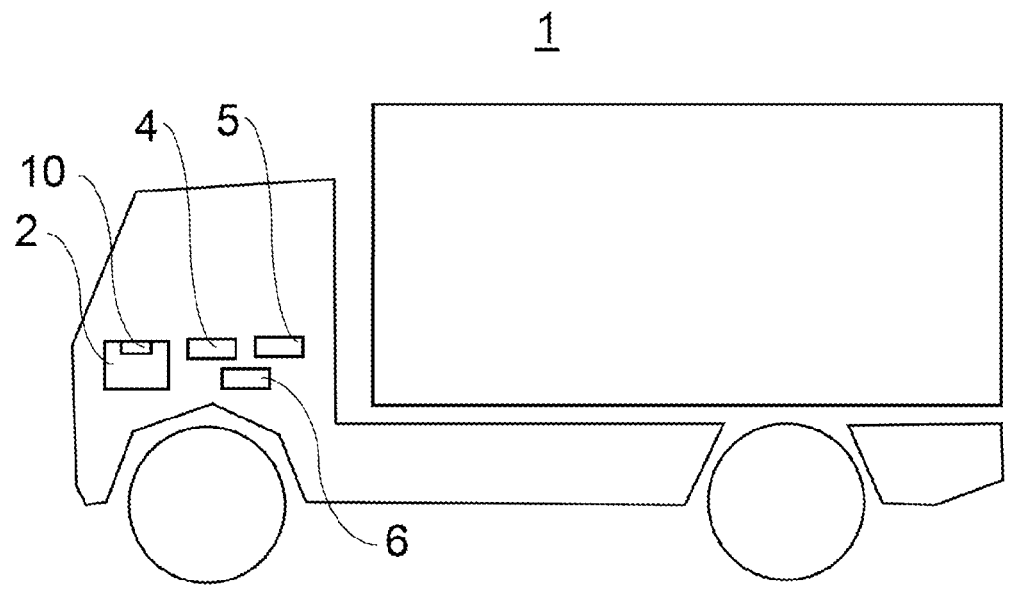
FIG. 1 shows a schematic view of the motor vehicle.

FIG. 1 shows a motor vehicle 1 designed as a heavy goods vehicle. As an alternative, some other commercial vehicle, e.g. a bus, or some other motor vehicle can also be provided.

The motor vehicle 1 has an internal combustion engine 2 having a variable valve gear 10. The motor vehicle 1 furthermore has a location device 4, a navigation system 5 and a driver assistance system 6.

The internal combustion engine 2 can be designed as a diesel, petrol or gas engine, for example. The inlet and exhaust valves (charge exchange valves) of the internal combustion engine 2 are actuated by means of a variable valve gear 10. The variable valve gear 10 allows adjustment of the timings of the charge exchange valves. In particular, the charge exchange valves can be adjusted in a cylinder-selective manner.

The location device 4 allows determination of a current position of the motor vehicle 1. The location device 4 can be a satellite location device, in particular a GPS device (global positioning system), for example.

The navigation system 5 allows navigation of the commercial vehicle 1 on the basis of the current position of the commercial vehicle and of a route, which can be read out of a route memory. The route can be determined on the basis of a destination which is input by a user, for example. Operationally relevant road properties of the roads stored in the route memory can furthermore be stored in a navigation database of the navigation system 5. The operationally relevant road properties can generally affect operation of the internal combustion engine. The information stored in the route memory can be updated wirelessly, e.g. over the Internet, or in a wired manner, e.g. by means of corresponding data storage media.

The driver assistance system 6 can allow partial or complete automation of the driving of the motor vehicle 1. In particular, the driver assistance system 6 can be designed as a cruise control system, preferably a headway-controlling cruise control system. In particular, the driver assistance system 6 can automatically control the operation or an operational aspect of the motor vehicle 1, taking into account the current position of the motor vehicle 1 and the impending route. In particular, the driver assistance system 6 can be a cruise control system controlled by a satellite location device, e.g. a GPS cruise control system.

Figure 2:
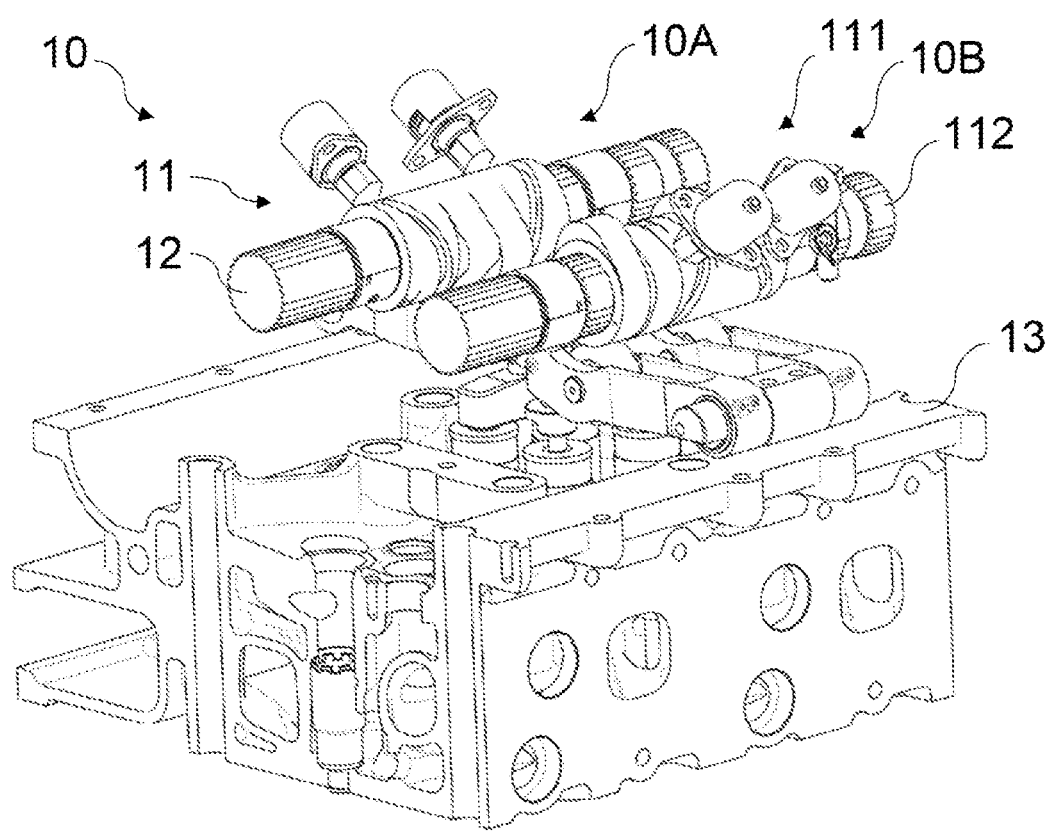
FIG. 2 shows a perspective view of a variable valve gear.

FIG. 2 shows a variable valve gear 10. The variable valve gear 10 has an inlet camshaft 12 and an exhaust camshaft 112. The inlet camshaft 12 and the exhaust camshaft 112 are arranged as overhead camshafts. The inlet camshaft 12 and the exhaust camshaft 112 form a double camshaft system. The double camshaft system is designed as a DOHC system (double overhead camshaft) since the inlet camshaft 12 and the exhaust camshaft 112 are arranged above a cylinder head 13 of the internal combustion engine. As an alternative, the inlet camshaft 12 or the exhaust camshaft 112 could form an SOHC system (single overhead camshaft), for example. In other embodiments, the inlet camshaft 12 and/or the exhaust camshaft 112 can also be arranged as bottom-mounted camshafts. It is likewise conceivable for one or more mixed-type camshafts to be provided for the actuation of inlet and exhaust valves.

At least one sliding cam system 11, 111 is arranged on the inlet camshaft 12 and the exhaust camshaft 112, respectively. The sliding cam system 11 of the inlet-side valve gear 10A is described in detail with reference to FIGS. 3 and 4. The sliding cam system 111 of the exhaust-side valve gear 10B is described in greater detail with reference to FIGS. 5 to 7.

Figure 3:
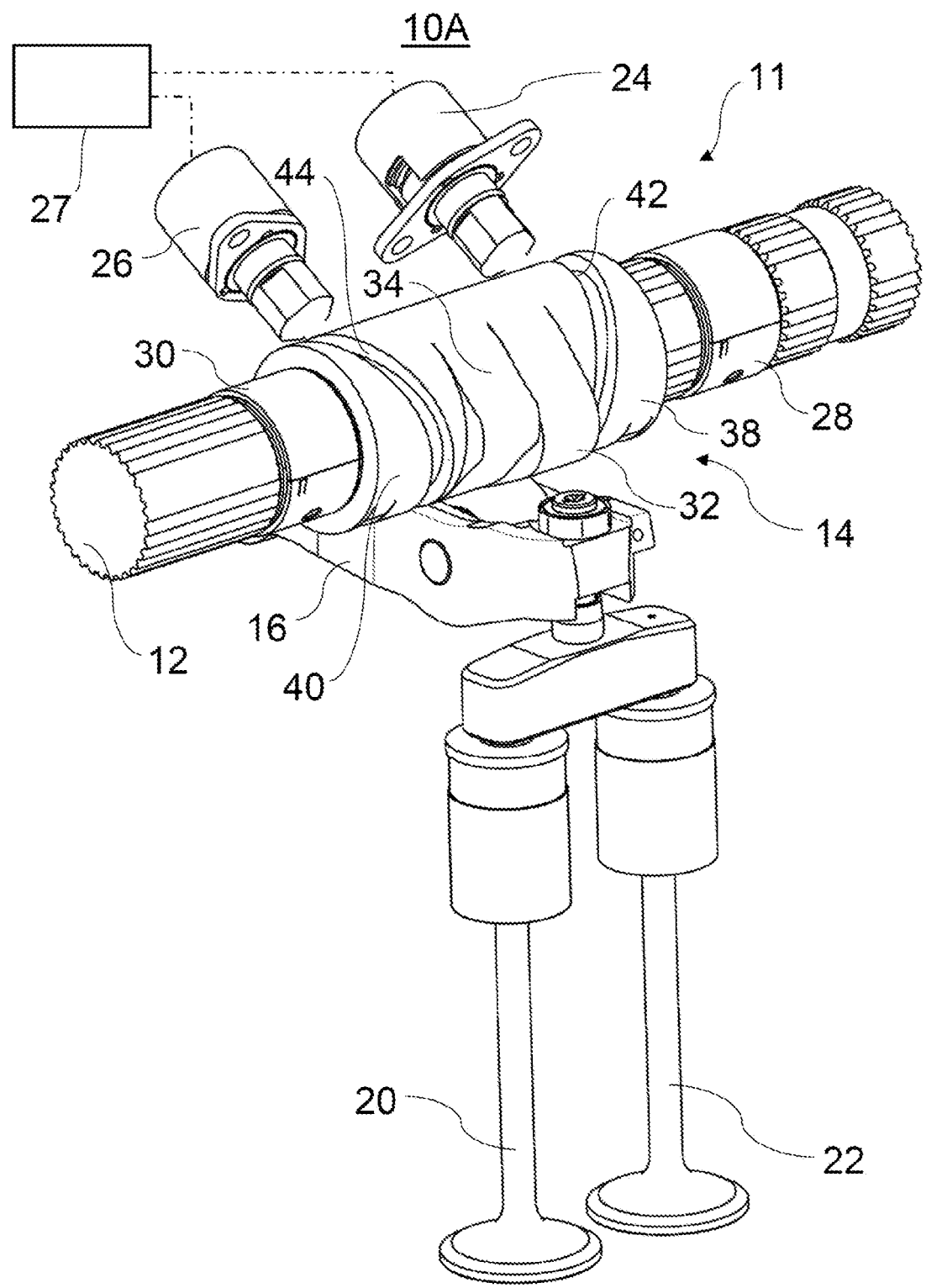
FIG. 3 shows a perspective view of an inlet-side variable valve gear.

The inlet-side variable valve gear 10A is shown in FIG. 3. The variable valve gear 10A has the inlet camshaft 12 and a cam carrier 14. In addition, the variable valve gear 10A has a transmission device 16 as well as a first and second inlet valve 20 and 22. Moreover, the variable valve gear 10A has a first actuator 24 and a second actuator 26. The cam carrier 14, the transmission device 16 and the actuators 24 and 26 form the sliding cam system 11. The inlet camshaft 12 actuates the inlet valves 20 and 22.

The cam carrier 14 is arranged for conjoint rotation on the inlet camshaft 12. In addition, the cam carrier 14 is arranged so as to be axially movable along a longitudinal axis of the inlet camshaft 12. The cam carrier 14 can be moved axially between a first stop 28 and a second stop 30.

A plurality of sliding cam systems 11 is provided on the inlet camshaft 12, and therefore there is a sliding cam system 11 available for each cylinder of the internal combustion engine for the purpose of cylinder-selective actuation of the at least one inlet valve 20, 22 of the respective cylinder.

The cam carrier 14 has two cams 32 and 34, which are offset from one another in a longitudinal direction of the cam carrier 14 and of the inlet camshaft 12. The first cam 32 and the second cam 34 are arranged in a central section of the cam carrier 14. The first cam 32 and the second cam 34 adjoin one another.

The first cam 32 is designed for actuation of the inlet valves 20 and 22 in a normal mode. In the normal mode, the inlet valves 20 and 22 close at the end of the inlet stroke in the region of a bottom dead centre position of a piston movement in accordance with a diesel- or Otto-cycle process.

The second cam 34 is designed for operation with an advanced closing point relative to the normal mode. In particular, the second cam 34 is designed for a Miller mode, in which the inlet valve is closed earlier than in a normal mode (diesel- or Otto-cycle process), in a region ahead of the bottom dead centre position of the piston movement in accordance with a Miller-cycle process.

In the Miller mode, the inlet valves 20, 22 close earlier. As a result, less air enters the combustion chamber. On the one hand, this leads to the internal combustion engine requiring less work for the charge exchange (i.e. induction of fresh air and expulsion of exhaust gas).

By virtue of the reduction in work, fuel efficiency can be increased in certain load ranges, i.e. fuel consumption can be lowered. The Miller mode can also be used to increase an exhaust gas temperature. Owing to the fact that less air enters the combustion chamber, a combustion air ratio λ can be reduced while fuel injection remains constant. As a result, the fuel/air mixture becomes richer or more concentrated. Combustion of the richer mixture leads to an increase in the exhaust gas temperature.

The cam carrier 14 furthermore has a first cam-less section 38 and a second cam-less section 40. The first cam-less section 38 and the second cam-less section 40 are arranged at opposite ends of the cam carrier 14. A first engagement track (shift slot) 42 extends in a spiral around a longitudinal axis of the cam carrier 14 in the first cam-less section 38. A second engagement track (shift slot) 44 extends in a spiral around the longitudinal axis of the cam carrier 14 in the second cam-less section 40.

To move the cam carrier 14 between the stops 28 and 30, the actuators 24 and 26 can engage selectively in the engagement tracks 42, 44 by means of extendable elements (not shown in detail). In particular, the first actuator 24 can engage selectively in the first engagement track 42 to move the cam carrier 14 from a first axial position to a second axial position. In the first axial position, the cam carrier 14 rests against the second stop 30. In the second axial position, the cam carrier 14 rests against the first stop 28. In FIG. 3, the cam carrier 14 is shown in the first axial position. The second actuator 26, in turn, can engage selectively in the second engagement track 44. The cam carrier 14 is then moved from the second axial position to the first axial position. The first actuator 24 and the second actuator 26 are controlled by a schematically illustrated control unit 27. The control unit 27 can be part of the driver assistance system 6 (see FIG. 1) or can be connected to the driver assistance system 6.

The movement is triggered by the fact that the extended element of the respective actuator 24, 26 is fixed in relation to an axial direction of the inlet camshaft 12. Consequently, the movable cam carrier 14 is moved in a longitudinal direction of the inlet camshaft 12 owing to the spiral shape of the engagement tracks 42, 44 when the extended element engages in the respective engagement track 42, 44. At the end of the process of movement, the movable element of the respective actuator 24, 26 is guided counter to the direction of extension by the respective engagement track 42, 44 and is thus retracted. The movable element of the respective actuator 24, 26 disengages from the respective engagement track 42, 44.

The transmission device 16 establishes an operative connection between the cam carrier 14 and the inlet valves 20, 22. The inlet valves 20, 22 are actuated (opened) when the first cam 32 or the second cam 34 presses the transmission device 16 downwards.

When the cam carrier 14 is in the first axial position, the first transmission device 16 is in operative connection between the first cam 32 and the inlet valves 20, 22. In other words, the transmission device 16 is not in operative connection between the second cam 34 and the inlet valves 20, 22 in the first axial position of the cam carrier 14. The inlet valves 20, 22 are actuated in accordance with a contour of the first cam 32. In the second axial position of the cam carrier 14, the transmission device 16 is in operative connection between the second cam 34 and the inlet valves 20, 22, which are actuated in accordance with a contour of the second cam 34.

In the illustrated embodiment, the transmission device 16 is designed as a finger follower. In other embodiments, the transmission device 16 can be designed as a rocker or tappet. In some embodiments, the transmission device 16 can have a cam follower, e.g. in the form of a rotatable roller.

Figure 4:
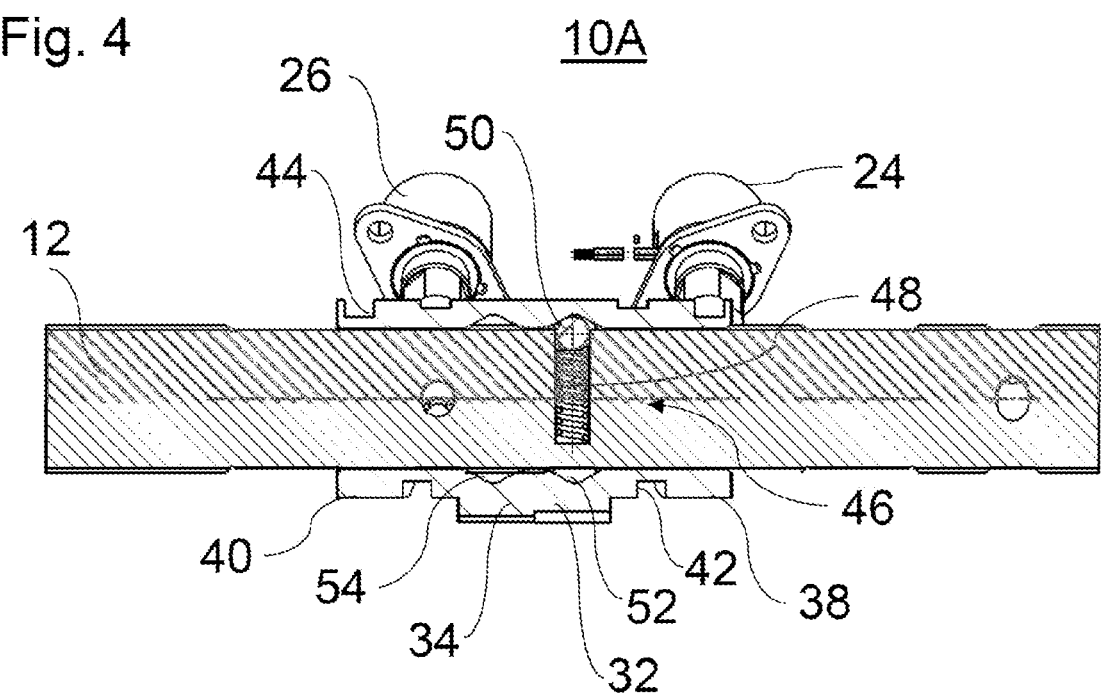
FIG. 4 shows a longitudinal section through the inlet-side variable valve gear.

With reference to FIG. 4, a locking device 46 is shown. The locking device 46 has an elastic element 48 and a catch 50. The elastic element 48 is arranged in a blind hole of the inlet camshaft 12. The elastic element 48 preloads the catch 50 against the cam carrier 14. A first and a second recess 52 and 54 are arranged in an inner circumferential surface of the cam carrier 14. To lock the cam carrier 14, the catch 50 is pressed into the first recess 52, for example, when the cam carrier 14 is in the first axial position. In the second axial position of the cam carrier 14, the catch 50 is pressed into the second recess 54.

Figure 5:
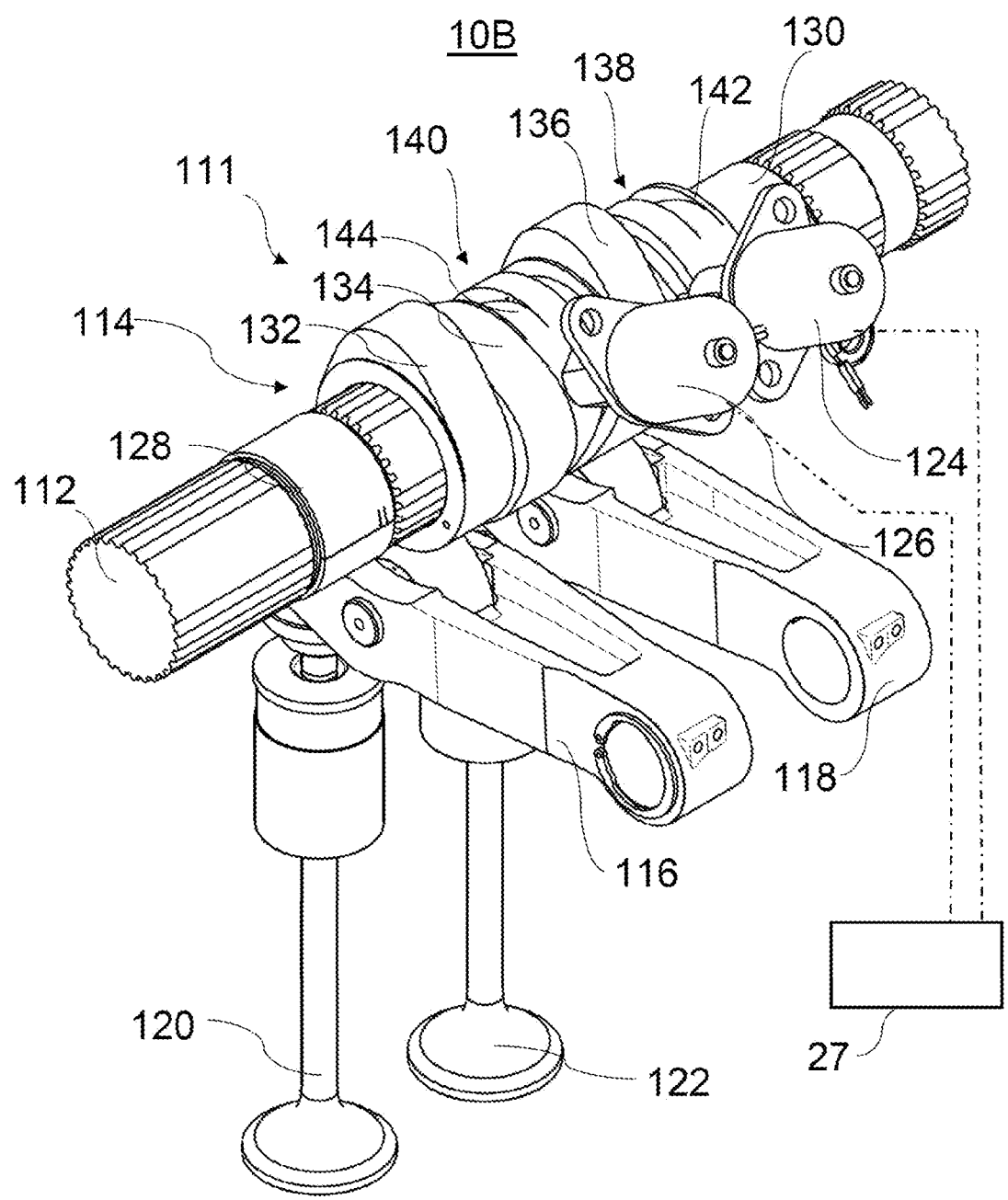
FIG. 5 shows a perspective view of an exhaust-side variable valve gear.

The exhaust-side variable valve gear 10B is shown in FIG. 5. The variable valve gear 10B has the exhaust camshaft 112 and a cam carrier 114. In addition, the variable valve gear 10B has a first and second transmission device 116 and 118 as well as a first and second exhaust valve 120 and 122. Moreover, the variable valve gear 10B has a first actuator 124 and a second actuator 126. The cam carrier 114, the transmission devices 116 and 118 and the actuators 124 and 126 form a sliding cam system 111.

A plurality of sliding cam systems 111 is provided on the exhaust camshaft 112, and therefore there is a sliding cam system 111 available for each cylinder of the internal combustion engine for the purpose of cylinder-selective actuation of the at least one exhaust valve 120, 122 of the respective cylinder.

The cam carrier 114 is arranged for conjoint rotation on the exhaust camshaft 112. In addition, the cam carrier 114 is arranged so as to be axially movable along the longitudinal axis of the exhaust camshaft 112. The cam carrier 114 can be moved axially between a first stop 128 and a second stop 130.

The cam carrier 114 is described below with reference to FIGS. 5 and 6. The cam carrier 114 has three cams 132, 134, and 136, which are offset from one another in a longitudinal direction of the cam carrier 114 and of the exhaust camshaft 112. The first cam 132 is arranged at a first end of the cam carrier 114 and is designed for a normal mode, as described in detail below by way of example. The second cam 134 is arranged adjoining the first cam 132 and is designed for an engine braking mode, as likewise described in detail below by way of example. The engine braking mode can be used to slow and/or brake the motor vehicle on downhill slopes. The engine braking mode can additionally be used during an upshift assistance mode. The third cam 136 is arranged at a distance from the second cam 134 and from the second end of the cam carrier 114. The third cam 136 is designed for the normal mode. The third cam 136 is shaped like the first cam 132.

The cam carrier 114 furthermore has a first cam-less section 138 and a second cam-less section 140. The first cam-less section 138 is arranged at the second end of the cam carrier 114. The second cam-less section 140 is arranged between the second cam 134 and the third cam 136. A first engagement track (shift slot) 142 extends in a spiral around a longitudinal axis of the cam carrier 114 in the first cam-less section 138. A second engagement track (shift slot) 144 extends in a spiral around the longitudinal axis of the cam carrier 114 in the second cam-less section 140.

To move the cam carrier 114 between the stops 128 and 130, the actuators 124 and 126 can engage selectively in the engagement tracks 142, 144 by means of extendable elements (not shown in detail). In particular, the first actuator 124 can engage selectively in the first engagement track 142 to move the cam carrier 114 from one axial position to another axial position. In a first axial position, the cam carrier 114 rests against the second stop 130. In the second axial position, the cam carrier 114 rests against the first stop 128. In FIG. 5, the cam carrier 114 is shown in the first axial position. The second actuator 126, in turn, can engage selectively in the second engagement track 144. The cam carrier 114 is then moved from the first axial position to the second axial position. The first actuator 124 and the second actuator 126 are controlled by the schematically illustrated control unit 27.

The movement is triggered by the fact that the extended element of the respective actuator 124, 126 is fixed in relation to an axial direction of the inlet camshaft 112. Consequently, the movable cam carrier 114 is moved in a longitudinal direction of the inlet camshaft 112 owing to the spiral shape of the engagement tracks 142, 144 when the extended element engages in the respective engagement track 142, 144. At the end of the process of movement, the movable element of the respective actuator 124, 126 is guided counter to the direction of extension by the respective engagement track 142, 144 and is thus retracted. The movable element of the respective actuator 124, 126 disengages from the respective engagement track 142, 144.

The first transmission device 116 and the second transmission device 118 establish an operative connection between the cam carrier 114 and the exhaust valves 120, 122. The first exhaust valve 120 is actuated (opened) when the first cam 132 or the second cam 134 presses the first transmission device 116 downwards. The second exhaust valve 122 is actuated (opened) when the third cam 136 presses the second transmission device 118 downwards.

When the cam carrier 114 is in the first axial position (as shown in FIGS. 1 to 4), the first transmission device 116 is in operative connection between the first cam 132 and the first exhaust valve 120. In other words, the first transmission device 116 is not in operative connection between the second cam 134 and the first exhaust valve 120 in the first axial position of the cam carrier 114. The first exhaust valve 120 is actuated in accordance with a contour of the first cam 132. In the second axial position of the cam carrier 114, the first transmission device 116 is in operative connection between the second cam 134 and the first exhaust valve 120. The first exhaust valve 120 is actuated in accordance with a contour of the second cam 134.

In the first axial position of the cam carrier 114, the second transmission device 118 is in operative connection between the third cam 136 and the second exhaust valve 122. The second exhaust valve 122 is actuated in accordance with a contour of the third cam 136. In the second axial position of the cam carrier 114, the second transmission device 118 does not actuate the second exhaust valve 122. In the second axial position of the cam carrier 114, a contact region 118A of the second transmission device 118 is in the same axial position with respect to the exhaust camshaft 112 as the first cam-less section 138. The first cam-less section 138 does not have a raised portion for actuating the second transmission device 118. When the cam carrier 114 is in the second axial position, the second exhaust valve 122 is not actuated.

The first cam-less section 138 thus has two functions. On the one hand, the first cam-less section 138 accommodates the first guide track 142. On the other hand, the first cam-less section 138 serves to ensure that no actuation of the second exhaust valve 142 takes place in the second axial position of the cam carrier 114. This functional integration is advantageous for reasons of installation space.

In the embodiment illustrated, the first transmission device 116 and the second transmission device 118 are each designed as a finger follower. In other embodiments, the transmission devices 116 and 118 can be designed as rockers or tappets. In some embodiments, the transmission devices 116 and 118 can have cam followers, e.g. in the form of rotatable rollers.

Figure 6:
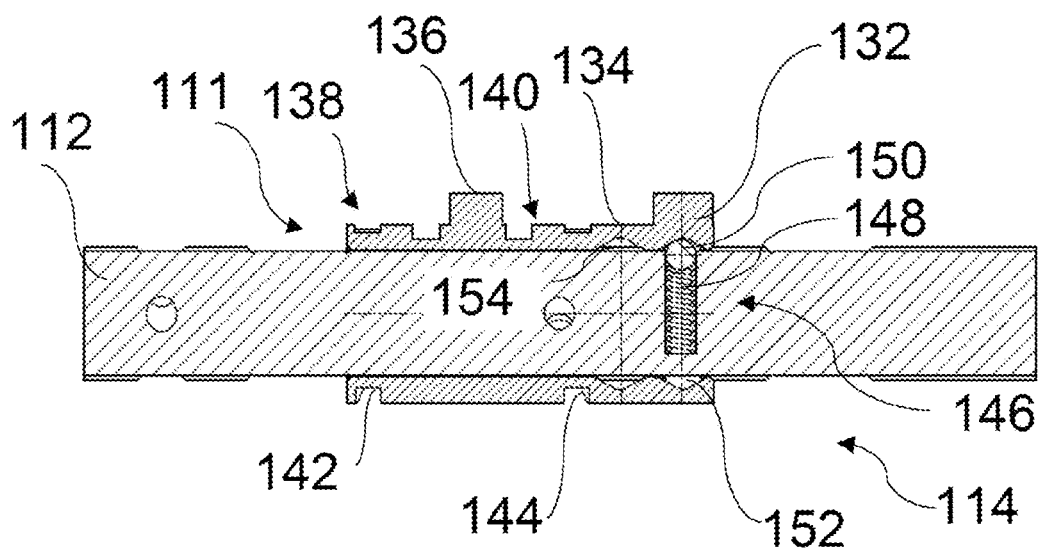
FIG. 6 shows a longitudinal section through the exhaust-side variable valve gear.

With reference to FIG. 6, a locking device 146 is shown. The locking device 146 has an elastic element 148 and a catch 150. The elastic element 148 is arranged in a blind hole of the exhaust camshaft 112. The elastic element 148 preloads the catch 150 against the cam carrier 114. A first and a second recess 152 and 154 are arranged in an inner circumferential surface of the cam carrier 114. To lock the cam carrier 114, the catch 150 is pressed into the first recess 152 when the cam carrier 114 is in the first axial position. In the second axial position of the cam carrier 114, the catch 150 is pressed into the second recess 154.

Figure 7:
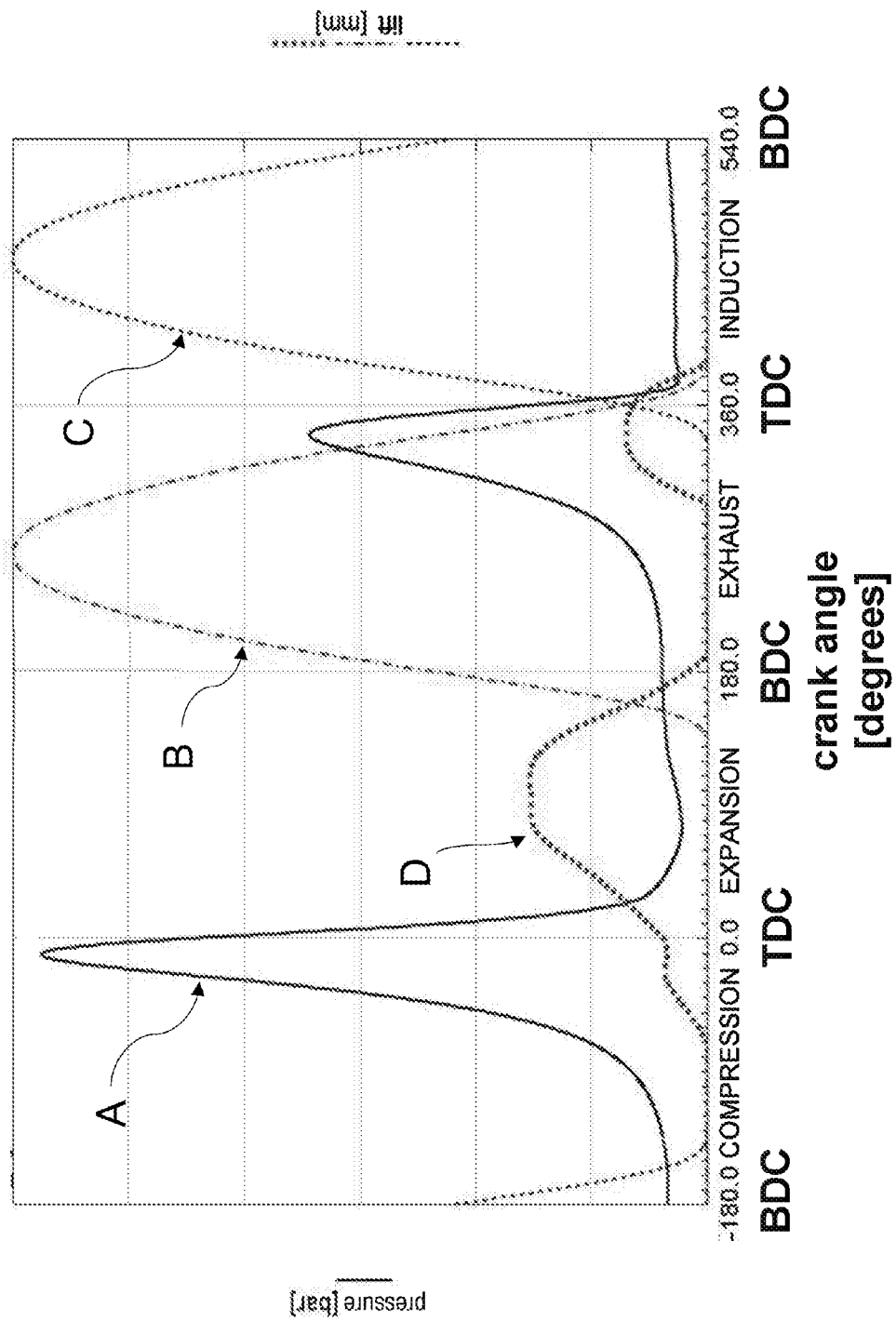
FIG. 7 shows a diagram comprising illustrative valve timing curves and a cylinder pressure profile.

The control of the first exhaust valve 120 and the effect thereof on a cylinder pressure are described below with reference to FIG. 7. FIG. 7 shows a complete four-stroke cycle comprising compression, expansion, exhaust and induction.

Curve A describes the profile of the cylinder pressure in the engine braking mode when the second cam 134 is in operative connection with the first exhaust valve 120. Curve B shows the profile of the valve lift of the first exhaust valve 120 when the first cam 132 is in connection with the first exhaust valve 120 (i.e. during the normal mode). The third curve C shows the profile of the valve lift of an inlet valve both during the normal mode and in the engine braking mode. Curve D shows the profile of the valve lift of the first exhaust valve 120 when the second cam 134 is in operative connection with the first exhaust valve 120 (i.e. during the engine braking mode).

Curve B shows that the exhaust valve is open during the exhaust stroke in the normal mode. Curve C shows that the inlet valve is open during the induction stroke (inlet stroke) in the normal mode and in the braking mode.

Curve D shows that the exhaust valve is opened slightly at the end of the compression stroke in the region of top dead centre at around 60° crank angle to 100° crank angle before top dead centre. At top dead centre, the exhaust valve is opened further and closes at the end of the expansion stroke, approximately at bottom dead centre. The opening of the exhaust valve at the end of the compression stroke has the effect that the compressed air in the cylinder is forced through the open exhaust valve into the exhaust system by the piston moving towards top dead centre. The compression work previously performed brakes the crankshaft and thus the internal combustion engine. The cylinder pressure initially rises in the compression stroke, but then falls even before top dead centre owing to the opening of the exhaust valve (cf. curve A). The open exhaust valve during the expansion stroke has the effect that air is sucked back into the cylinder from the exhaust lines. At the end of the expansion stroke, the cylinder is substantially filled with air from the exhaust system.

Curve D furthermore shows that the exhaust valve initially remains closed after bottom dead centre is reached at the end of the expansion stroke. At the end of the exhaust stroke, the exhaust valve opens in the region of top dead centre. Once again, opening takes place at around 60° crank angle to 100° crank angle before top dead centre. The closed exhaust valve during the exhaust stroke has the effect that the air drawn in in the expansion stroke is compressed with the performance of work. The cylinder pressure rises (curve A). The compression work brakes the crankshaft and thus the internal combustion engine. The opening of the exhaust valve at the end of the exhaust stroke has the effect that the air is forced into the exhaust system through the open exhaust valve. In the induction stroke, the cylinder is refilled with air through the open inlet valve or valves (curve C). The cycle begins again.

As explained above, the use of the second cam leads to the control of the exhaust valve for a double compression with subsequent decompression, thus providing an engine braking functionality.

In addition, the engine braking mode can be used in a gear change during an upshift assistance mode in order to shorten a shift duration of an automatic transmission. In the upshift assistance mode, a speed of the internal combustion engine can be reduced very quickly. Moreover, the fact that no exhaust gas throttle valve is used for the engine brake when upshifting means that there is a positive effect on a turbocharger speed and a boost pressure of the turbocharger during the upshift, thus ensuring that there is no turbo lag or only a small amount of turbo lag after the selection of the higher gear.

As is obvious from a comparison of curves B and D, the valve lift of the exhaust valve in the braking mode (curve D) is less than in the normal mode (curve B). Moreover, the valve lift during the opening of the exhaust valve in the compression and the expansion stroke has two stages. These measures have the effect that the load on the variable valve gear in the braking mode is reduced since high loads on the valve gear can occur owing to the opening of the exhaust valve counter to the pressure in the cylinder.

FIG. 8 shows an illustrative operating method for the driver assistance system 6 (see FIG. 1).

In step S2, a current position of the motor vehicle is determined. To determine the current position, the location device 4 (see FIG. 1) can be used.

On the basis of the current position determined, the impending route is determined in step S4. The route can be read out from the route memory of the navigation system 5 (see FIG. 1), for example, or can be received directly via a data link. In addition to the impending route, the operationally relevant road properties are determined in step S6. The road properties can be read out from a navigation database or received via a data link, for example. Examples of operationally relevant road properties are a road topology, e.g. a downhill slope, an uphill slope and/or a bend of the road, and a traffic regulation applying to the road, in particular a speed limit and/or a priority regulation. Another possible operationally relevant road property is the current traffic situation, e.g. congestion, on the impending route.

Depending on the operationally relevant road properties on the impending route of the motor vehicle and, in particular, depending on the current position of the motor vehicle, a driving recommendation is determined by the driver assistance system 6 in step S8.

The vehicle driver of the motor vehicle can be informed of the driving recommendation. In particular, the informing of the motor vehicle driver can increase acceptance of the driver assistance system 6 (see FIG. 1). As an alternative or in addition, the driver assistance system 6 (see FIG. 1) can implement the driving recommendation automatically. The driving recommendation can, for example, comprise operating the motor vehicle 1 in a low-load range, an automatic gear change to a higher gear or a sustained braking mode.

Based on the driving recommendation, the variable valve gear 10 (see FIG. 1) can be set in step S10.

For example, at least one sliding cam system 11 on the inlet side can be activated by the control unit 27 to switch to a Miller timing (see FIGS. 3 and 4). Depending on the situation, it is thereby possible to save fuel, to variably adapt an exhaust gas temperature, to variably adapt an operating point of a turbocharger and/or to variably adapt an air throughput. The number of inlet valves 20, 22 in the Miller mode can be set in accordance with a desired exhaust gas temperature, a desired air throughput, a load of the internal combustion engine and/or an operating point of the turbocharger of the internal combustion engine, for example.

It is possible to conceive of various situations in which automatic switching to the Miller mode may be worthwhile. For example, a low load of the internal combustion engine is to be expected for a certain time owing to the impending route. This can be the case with an impending route that has a slight downhill slope or no downhill slope. Here, it may be worthwhile to switch at least one inlet valve to the Miller mode. It is thereby possible, for example, to improve fuel efficiency in the low-load range since less work is required for the charge exchange. It is likewise possible to increase an exhaust gas temperature even before the low-load section of road in order, for example, to charge up an SCR catalytic converter with thermal energy before this section of road.

It is also possible that only a very short load change to a low-load range of the internal combustion engine is to be expected on the basis of the operationally relevant road properties of the impending route. Here, it is possible to dispense with switching to the Miller mode for fuel-efficient operation of the internal combustion engine owing to the only very short load change. On the other hand, it would be possible to dispense with a switch from the Miller mode to the normal mode if, for example, only a very short load change to the medium-load range is in prospect.

In another embodiment, at least one sliding cam system 111 on the exhaust side can be activated by the control unit 27 in order to switch to the engine braking mode (see FIGS. 5 and 6).

Thus, for example, it is possible additionally to switch one or more cylinders to the engine braking mode in the case of a slowly increasing downhill slope on the impending route. For this purpose, the sliding cam system 111 can put the second cam 134 into operative connection with the first exhaust valve 120, for example (see FIGS. 5 and 6).

In another example, at least one cylinder can be switched to the engine braking mode in the event of an impending reduction in the permitted maximum speed and/or an impending construction site or an impending traffic jam. Thus, an appropriate reduction in the speed of the motor vehicle can be enabled promptly upon reaching the section of road with the reduced maximum speed or upon reaching the construction site or the traffic jam.

In another example, there is the possibility of switching to the normal mode from the engine braking mode just before the end of a downhill slope. Thus, the motor vehicle can coast or optionally increase a speed, and an engine braking mode within a section of road without a downhill slope can be prevented.

In another variant embodiment, at least one sliding cam system 111 on the exhaust side can be switched to the upshift assistance mode if the operationally relevant road properties of the impending route require a gear change to a higher gear. The time of the gear change can be considerably reduced in the case of an automatic transmission by the upshift assistance mode since this allows a rapid reduction in engine speed.

As embodied here by way of example, the operating method for the driver assistance system 6 allows anticipatory switching behaviour of an automatic transmission in combination with the thermodynamic aspects of the internal combustion engine. It is furthermore possible, when using sliding cam systems, to avoid unnecessary switching operations of the sliding cam systems when traversing the engine map.

The disclosure is not restricted to the illustrative embodiments described above. On the contrary, a large number of variants and modifications is possible which likewise make use of the concepts and therefore fall within the scope of protection.

LIST OF REFERENCE SIGNS 1 motor vehicle
2 internal combustion engine
4 location device
5 navigation system
6 driver assistance system
10 variable valve gear
10A inlet-side variable valve gear
10B exhaust-side variable valve gear
11 sliding cam system
12 inlet camshaft
13 cylinder head
14 cam carrier of the sliding cam system 11
16 transmission device (finger follower) of the sliding cam system 11
20 first inlet valve of the sliding cam system 11
22 second inlet valve of the sliding cam system 11
24 first actuator of the sliding cam system 11
26 second actuator of the sliding cam system 11
27 control unit
28 first stop of the sliding cam system 11
30 second stop of the sliding cam system 11
32 first cam of the sliding cam system 11
34 second cam of the sliding cam system 11
38 first cam-less section of the sliding cam system 11
40 second cam-less section of the sliding cam system 11
42 first engagement track of the sliding cam system 11
44 second engagement track of the sliding cam system 11
46 locking device of the sliding cam system 11
48 elastic element of the sliding cam system 11
50 catch of the sliding cam system 11
52 first recess of the sliding cam system 11
54 second recess of the sliding cam system 11
111 sliding cam system
112 exhaust camshaft
114 cam carrier of the sliding cam system 111
116 first transmission device (first finger follower) of the sliding cam system 111
118 second transmission device (second finger follower) of the sliding cam system 111
118A contact region of the sliding cam system 111
120 first exhaust valve of the sliding cam system 111
122 second exhaust valve of the sliding cam system 111
124 first actuator of the sliding cam system 111
126 second actuator of the sliding cam system 111
128 first stop of the sliding cam system 111
130 second stop of the sliding cam system 111
132 first cam of the sliding cam system 111
134 second cam of the sliding cam system 111
136 third cam of the sliding cam system 111
138 first cam-less section of the sliding cam system 111
140 second cam-less section of the sliding cam system 111
142 first engagement track of the sliding cam system 111
144 second engagement track of the sliding cam system 111
146 locking device of the sliding cam system 111
148 elastic element of the sliding cam system 111
150 catch of the sliding cam system 111
152 first recess of the sliding cam system 111
154 second recess of the sliding cam system 111
A cylinder pressure
B exhaust valve timing curve
C inlet valve timing curve
D exhaust valve timing curve

We claim:

1. An operating method for a driver assistance system of a motor vehicle having an internal combustion engine that has a variable valve gear for adjusting valve timing curves of inlet valves or exhaust valves of the internal combustion engine, the operating method comprising:

determining at least one operationally relevant property of a road on an impending route of the motor vehicle, wherein the at least one operationally relevant property of the road affects operation of the internal combustion engine of the motor vehicle;

determining a driving recommendation in accordance with the at least one operationally relevant property of the road on the impending route of the motor vehicle, wherein the driving recommendation comprises a gear change to a higher gear;

setting the variable valve gear in accordance with the driving recommendation;

switching the variable valve gear to an upshift assistance mode to shorten a duration of the gear change;

determining a number of exhaust valves less than a total number of the exhaust valves of the internal combustion engine to operate in the upshift assistance mode based on the at least one operationally relevant property of the road on the impending route of the motor vehicle, a required speed reduction for the gear change, a required torque increase for the gear change, a desired duration of the gear change, a desired turbocharger speed or a desired boost pressure; and in the upshift assistance mode:
initially holding the determined number of exhaust valves closed in a compression stroke;
opening the determined number of exhaust valves between 100° crank angle and 60° crank angle before top dead centre of a piston movement is reached in the compression stroke to decompress the compressed air;
after opening the determined number of exhaust valves in the compression stroke, closing the determined number of exhaust valves in a region between bottom dead centre and 30° crank angle after bottom dead centre;
opening the determined number of exhaust valves between 100° crank angle and 60° crank angle before top dead centre of the piston movement is reached in the exhaust stroke to decompress the compressed air; and
after opening the determined number of exhaust valves in the exhaust stroke, closing the determined number of exhaust valves in a region between top dead centre and 30° crank angle after top dead centre.

2. The operating method according to claim 1, wherein the driver assistance system is a cruise control system controlled by a satellite location device.

3. The operating method according to claim 1, wherein the variable valve gear includes a plurality of sliding cam systems.

4. The operating method according to claim 3, wherein each sliding cam system has a cam carrier, which is arranged on a camshaft of the internal combustion engine in a manner which prevents relative rotation and allows axial movement and has a first cam for a normal mode and a second cam, arranged offset in a longitudinal direction of the camshaft, for an engine braking mode, an upshift assistance mode or a Miller mode, wherein each sliding cam system puts the first cam and at least one exhaust valve or inlet valve into operative connection or puts the second cam and at least one exhaust valve or inlet valve into operative connection.

5. The operating method according to claim 1, wherein the motor vehicle is a commercial vehicle.

6. The operating method according to claim 1, wherein the variable valve gear allows adjustment of the inlet valves or the exhaust valves within a predetermined adjustment range, and the driving recommendation is additionally determined in accordance with the predetermined adjustment range.

7. The operating method according to claim 1, further comprising:
    informing a vehicle driver acoustically, visually or haptically of the driving recommendation, or
    automatically implementing the driving recommendation by the motor vehicle or the driver assistance system.

8. The operating method according to claim 1, wherein the at least one operationally relevant property of the road comprises a topology, a downhill slope, an uphill slope or a bend of the road, of the impending route.

9. The operating method according to claim 1, further comprising:
    determining a current position of the motor vehicle by a location device; or
    determining the impending route of the motor vehicle, in accordance with a current position of the motor vehicle; or
    reading the at least one operationally relevant property of the road out of a navigation database or receiving the at least one operationally relevant property of the road; or
    determining the driving recommendation in accordance with the at least one operationally relevant property of the road on the impending route of the motor vehicle and with the current position of the motor vehicle.

10. The operating method according to claim 1, wherein the variable valve gear sets the valve timing curves of the inlet valves or the exhaust valves in a cylinder-selective manner in accordance with the driving recommendation.

11. The operating method according to claim 1, wherein the driving recommendation comprises adapting an exhaust gas temperature, adapting an operating point of a turbocharger of the internal combustion engine, adapting an air flow rate or operating the internal combustion engine in a low load range, and
    wherein the operating method further comprises switching the variable valve gear to a Miller mode.

12. The operating method according to claim 11, further comprising determining a number of exhaust valves to operate in the Miller mode in accordance with the at least one operationally relevant property of the road on the impending route of the motor vehicle, with a desired exhaust gas temperature, with a desired air flow rate, with a load of the internal combustion engine or with the operating point of the turbocharger of the internal combustion engine.

13. The operating method according to claim 1, wherein the variable valve gear adjusts the valve timing curves only for some of the inlet valves or the exhaust valves in accordance with the driving recommendation.

14. The operating method according to claim 1, wherein the at least one operationally relevant property of the road comprises a traffic regulation, a speed restriction or a priority regulation, applying to the road.

15. The operating method according to claim 1, wherein the at least one operationally relevant property of the road comprises a current traffic situation.

16. An operating method for a driver assistance system of a motor vehicle having an internal combustion engine that has a variable valve gear for adjusting valve timing curves of inlet valves or exhaust valves of the internal combustion engine, comprising:
    determining at least one operationally relevant property of a road on an impending route of the motor vehicle, wherein the at least one operationally relevant property of the road affects operation of the internal combustion engine of the motor vehicle;
    determining a driving recommendation based on the at least one operationally relevant property of the road on the impending route of the motor vehicle, wherein the driving recommendation comprises a sustained braking mode of the internal combustion engine;
    setting the variable valve gear in accordance with the driving recommendation;
    switching the variable valve gear to an engine braking mode;
    determining a number of exhaust valves less than a total number of the exhaust valves of the internal combustion engine to operate in the engine braking mode based on at least one operationally relevant property of the road on the impending route of the motor vehicle; and
    in the engine braking mode:
        initially holding the determined number of exhaust valves closed in a compression stroke;
        opening the determined number of exhaust valves between 100° crank angle and 60° crank angle before top dead centre of a piston movement is reached in the compression stroke to decompress the compressed air;
        after opening the determined number of exhaust valves in the compression stroke, closing the determined number of exhaust valves in a region between bottom dead centre and 30° crank angle after bottom dead centre;
        opening the determined number of exhaust valves between 100° crank angle and 60° crank angle before top dead centre of the piston movement is reached in the exhaust stroke to decompress the compressed air; and
        after opening the determined number of exhaust valves in the exhaust stroke, closing the determined number of exhaust valves in a region between top dead centre and 30° crank angle after top dead centre.

17. A motor vehicle, comprising:
    an internal combustion engine having a variable valve gear for adjusting valve timing curves of inlet valves or exhaust valves of the internal combustion engine;
    a location device; and
    a driver assistance system configured to:
        determine at least one operationally relevant property of a road on an impending route of the motor vehicle, wherein the at least one operationally relevant property of the road affects operation of the internal combustion engine of the motor vehicle;
        determine a driving recommendation in accordance with the at least one operationally relevant property of the road on the impending route of the motor vehicle, wherein the driving recommendation comprises a gear change to a higher gear;
        set the variable valve gear in accordance with the driving recommendation;

switch the variable valve gear to an upshift assistance mode to shorten a duration of the gear change;

determine a number of exhaust valves less than a total number of the exhaust valves of the internal combustion engine to operate in the upshift assistance mode based on the at least one operationally relevant property of a road on the impending route of the motor vehicle, a required speed reduction for the gear change, a required torque increase for the gear change, a desired duration of the gear change, a desired turbocharger speed or a desired boost pressure; and in the upshift assistance mode:
  initially holding the determined number of exhaust valves closed in a compression stroke;
  opening the determined number of exhaust valves between 100° crank angle and 60° crank angle before top dead centre of a piston movement is reached in the compression stroke to decompress the compressed air;
  after opening the determined number of exhaust valves in the compression stroke, closing the determined number of exhaust valves in a region between bottom dead centre and 30° crank angle after bottom dead centre;
  opening the determined number of exhaust valves between 100° crank angle and 60° crank angle before top dead centre of the piston movement is reached in the exhaust stroke to decompress the compressed air; and
  after opening the determined number of exhaust valves in the exhaust stroke, closing the determined number of exhaust valves in a region between top dead centre and 30° crank angle after top dead centre.

18. The motor vehicle according to claim 17, further comprising a navigation system.

19. The motor vehicle according to claim 17, wherein the internal combustion engine has a plurality of cylinders.

20. The motor vehicle according to claim 19, wherein the variable valve gear includes:
  an inlet valve of the inlet valves or an exhaust valve of the exhaust valves;
  a camshaft; and
  a plurality of sliding cam systems for the plurality of cylinders, wherein each sliding cam system has a cam carrier, which is arranged on the camshaft in a manner which prevents relative rotation and allows axial movement and has a first cam and a second cam, wherein the first cam and the second cam are arranged offset in a longitudinal direction of the camshaft.

* * * * *